(12) United States Patent
Gallione

(10) Patent No.: US 10,543,817 B2
(45) Date of Patent: Jan. 28, 2020

(54) POWERED REAR OUTRIGGER SYSTEMS

(71) Applicant: Schwing America, Inc., St. Paul, MN (US)

(72) Inventor: Joseph Gallione, Naperville, IL (US)

(73) Assignee: Schwing America, Inc., St. Paul, MN (US)

( * ) Notice: Subject to any disclaimer, the term of this patent is extended or adjusted under 35 U.S.C. 154(b) by 116 days.

(21) Appl. No.: 15/843,198

(22) Filed: Dec. 15, 2017

(65) Prior Publication Data

US 2018/0170322 A1    Jun. 21, 2018

Related U.S. Application Data

(60) Provisional application No. 62/434,996, filed on Dec. 15, 2016.

(51) Int. Cl.
| | |
|---|---|
| *B60S 9/10* | (2006.01) |
| *B66C 23/80* | (2006.01) |
| *E02F 9/08* | (2006.01) |
| *B60S 9/22* | (2006.01) |
| *B66C 23/78* | (2006.01) |

(52) U.S. Cl.
CPC .............. *B60S 9/10* (2013.01); *B66C 23/80* (2013.01); *E02F 9/085* (2013.01)

(58) Field of Classification Search
CPC . B66C 23/78; B66C 23/80; B60S 9/00; B60S 9/02; B60S 9/10; B60S 9/12; B60S 9/22
See application file for complete search history.

(56) References Cited

U.S. PATENT DOCUMENTS

| | | | | |
|---|---|---|---|---|
| 4,118,054 A | * | 10/1978 | Vigerie | B66C 23/80 212/304 |
| 4,273,244 A | * | 6/1981 | Jensen | B66C 23/80 180/125 |
| 4,345,873 A | * | 8/1982 | Wymore | B66F 9/07559 212/304 |
| 4,469,014 A | * | 9/1984 | Nelson | F15B 15/24 403/337 |
| 4,624,357 A | * | 11/1986 | Oury | B65G 21/14 198/313 |

(Continued)

OTHER PUBLICATIONS

"Ashmore Concrete Pumping—Over 200 feet of Vertical Reach with Our Mighty 63Z-Meter_Putzmeister Product Specifications", 20 pages.

(Continued)

*Primary Examiner* — James A Shriver, II
*Assistant Examiner* — Vaughn Coolman
(74) *Attorney, Agent, or Firm* — Faegre Baker Daniels LLP

(57) ABSTRACT

An outrigger system includes an outrigger frame, a pair of hydraulic cylinders coupled to the outrigger frame, a pair of rear outriggers coupled to the outrigger frame and coupled to respective hydraulic cylinders, and a pair of multi-arm assemblies coupled to respective rear outriggers and respective hydraulic cylinders and arranged to permit the pair of rear outriggers to rotate, with respect to the outrigger frame, among a first stowed position, a first fully deployed position, and a first site transportation position via extension and retraction of the pair of hydraulic cylinders.

20 Claims, 11 Drawing Sheets

(56) References Cited

U.S. PATENT DOCUMENTS

| | | | |
|---|---|---|---|
| 6,257,619 B1* | 7/2001 | Bender | B60S 9/10 |
| | | | 212/304 |
| 6,390,504 B1* | 5/2002 | Fetzer | B60S 9/02 |
| | | | 280/763.1 |
| 6,516,917 B1* | 2/2003 | Mayer | B66C 23/80 |
| | | | 182/17 |
| 6,675,822 B1 | 1/2004 | Schmitz et al. | |
| 6,773,033 B1 | 8/2004 | Fügel | |
| 6,779,688 B1 | 8/2004 | Mayer | |
| 6,834,911 B2 | 12/2004 | Schillinger et al. | |
| 6,840,540 B2 | 1/2005 | Fügel | |
| 6,862,509 B2 | 3/2005 | Rau et al. | |
| 6,883,532 B2 | 4/2005 | Rau | |
| 6,983,763 B2 | 1/2006 | Benckert et al. | |
| 7,011,108 B2 | 3/2006 | Benckert et al. | |
| 7,012,540 B2 | 3/2006 | Petzold et al. | |
| 7,048,006 B2 | 5/2006 | Hurr | |
| 7,131,820 B2 | 11/2006 | Benckert | |
| 7,195,258 B2 | 3/2007 | Petzold et al. | |
| 7,204,269 B2 | 4/2007 | Alwes et al. | |
| 7,322,802 B2 | 1/2008 | Benckert et al. | |
| 7,478,834 B2 | 1/2009 | Schlecht | |
| 7,543,851 B2 | 6/2009 | Wolfram et al. | |
| 7,552,828 B2 | 6/2009 | Fügel | |
| 7,611,331 B2 | 11/2009 | Hoefling et al. | |
| 7,631,659 B2 | 12/2009 | Schneider et al. | |
| 7,654,286 B2 | 2/2010 | Fuegel | |
| 7,654,800 B2 | 2/2010 | Leibbrand et al. | |
| 7,657,355 B2 | 2/2010 | Rau et al. | |
| 7,729,832 B2 | 6/2010 | Benckert et al. | |
| 7,784,354 B2 | 8/2010 | Gelies | |
| 7,882,854 B2 | 2/2011 | Quier | |
| 7,900,651 B2 | 3/2011 | Göggelmann et al. | |
| 7,909,059 B2 | 3/2011 | Wehner et al. | |
| 8,087,695 B2 | 1/2012 | Fügel et al. | |
| 8,224,577 B2 | 7/2012 | Gelies et al. | |
| 8,235,441 B2 | 8/2012 | Pirwass | |
| 8,281,811 B2 | 10/2012 | Rau | |
| 8,282,130 B2 | 10/2012 | Fuegel | |
| 8,366,148 B2 | 2/2013 | Benz et al. | |
| 8,381,771 B2 | 2/2013 | Goeggelmann et al. | |
| 8,727,379 B2 | 5/2014 | Goeggelmann et al. | |
| 8,794,670 B2 | 8/2014 | Fuegel | |
| 9,062,465 B2 | 6/2015 | Neubert et al. | |
| 9,068,366 B2 | 6/2015 | Petzold et al. | |
| 9,175,484 B2 | 11/2015 | Fuegel | |
| 9,290,955 B2 | 3/2016 | Braun | |
| 9,371,214 B2 | 6/2016 | Gerlof et al. | |
| 9,371,657 B2 | 6/2016 | Braun | |
| 9,376,827 B2 | 6/2016 | Hasel et al. | |
| 9,377,032 B2 | 6/2016 | Fuegel | |
| 9,383,040 B2 | 7/2016 | Westermann | |
| 9,410,334 B2 | 8/2016 | Fügel et al. | |
| 9,476,211 B2 | 10/2016 | Westermann | |
| 2010/0253044 A1* | 10/2010 | Benz | B62D 21/186 |
| | | | 280/433 |
| 2010/0264635 A1* | 10/2010 | Fuegel | B62D 53/04 |
| | | | 280/763.1 |
| 2011/0186693 A1* | 8/2011 | McMiles | F16L 3/08 |
| | | | 248/65 |
| 2014/0326330 A1* | 11/2014 | Xu | B66C 23/78 |
| | | | 137/351 |

OTHER PUBLICATIONS

"Putzmeister 46X-Meter Truck-Mounted Concrete Boom Pump", Product Brochure, Putzmeister America 2004, 2 pages.
"Putzmelster Telebelt® TB 110 Telescopic Belt Conveyor", Product Brocure, Putzmeister America, Inc. 2016, 6 pages.

* cited by examiner

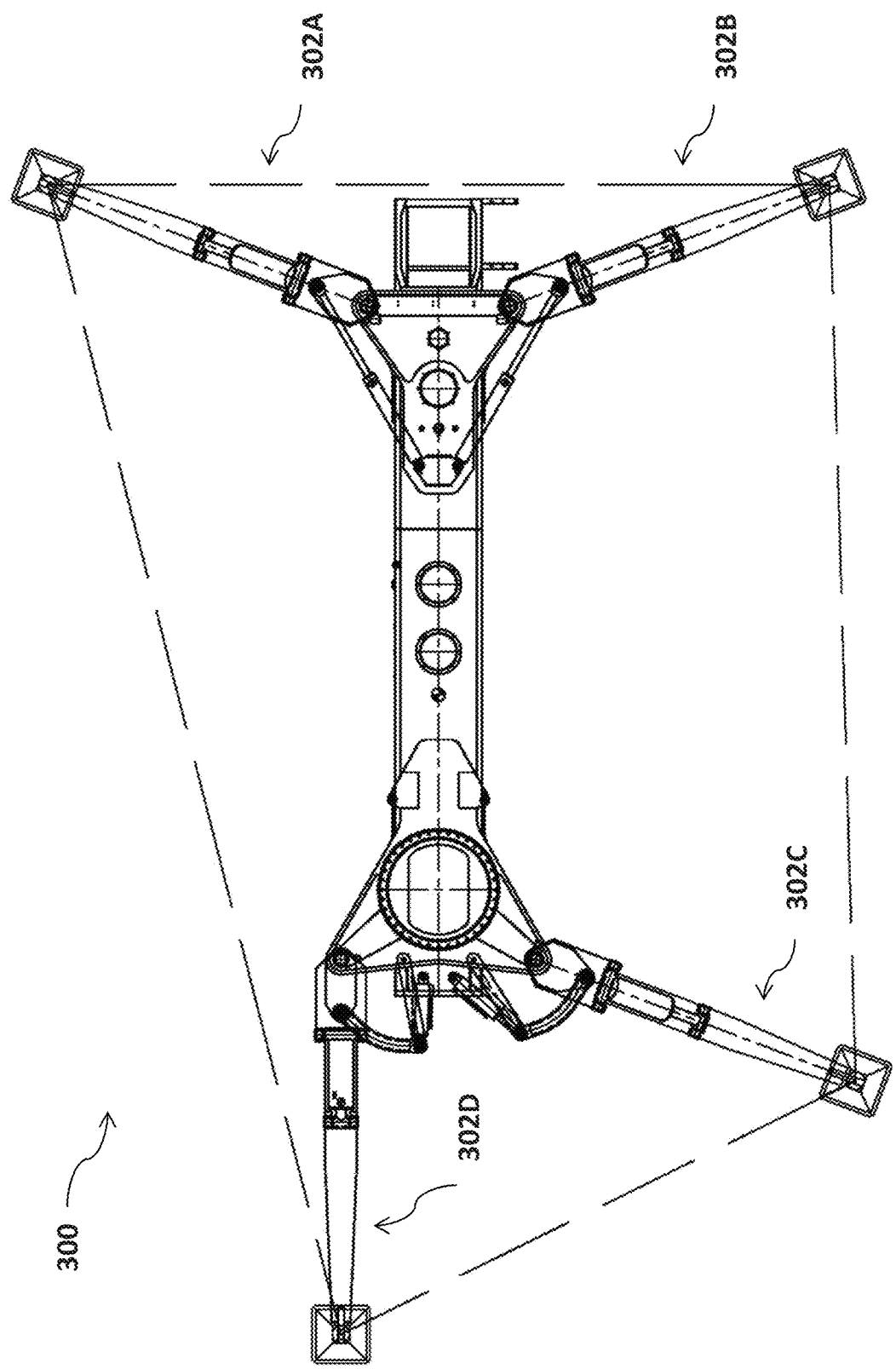

900

900

US 10,543,817 B2

POWERED REAR OUTRIGGER SYSTEMS

RELATED APPLICATION

This application claims priority to Provisional Application No. 62/434,996, filed Dec. 15, 2016, which is herein incorporated by reference in its entirety.

FIELD OF THE INVENTION

The present disclosure relates to vehicles with a mounted apparatus and requiring stabilizing during operation of the apparatus. Example apparatuses include concrete conveyors, concrete pumps, cranes, lifts, back hoes, etc.

BACKGROUND

Vehicles with conveyers, pumps, cranes, etc., mounted on them must be stabilized during use of the conveyors, pumps, cranes, etc. One approach involves using outriggers, which extend beyond the vehicle's frame and wheels. When not in use, these outriggers must be stowed substantially within the boundaries of the vehicle during road transport.

A system of swing outriggers, which are known in the art, typically includes a pair of front outriggers pivotally mounted near the vehicle's cab on opposite sides of the vehicle. These front outriggers swing forward about a pivot point from their stowed position to a stability position. The outrigger system also typically includes rear outriggers pivotally mounted near a back end of the vehicle on opposite sides of the vehicle. These rear outriggers swing backward about a pivot point from their stowed position to a stability position. The front and rear swing outriggers are pivotally mounted via generally horizontal arms and include a joint from which a leg can be pivotally lowered to contact a firm surface in the stability position.

Powered outriggers are preferred for safety and ease of use because outriggers are heavy and injuries can result when manually deploying and storing the outriggers. In addition, powered mechanisms can ensure full deployment, which is important for safety during operation, and full stowage, which is important for safety during transport. Powered deployment and stowage is also strongly preferred for ease of use.

Top-down perspective views of a prior art powered outrigger system 100 is pictured in FIGS. 1A and 1B, which show both the deployed stability position (FIG. 1A) and the storage position for road transport (FIG. 1B). The system 100 includes four outriggers 102A-D, and each outrigger includes a hydraulic cylinder 104A-D that extends to place the associated outrigger in the stability position and then retracts to place the associated outrigger in the stowed position. The hydraulic cylinders 104A-D are pivotally mounted at one point to a box beam and pivotally mounted at the other end to the arm of a respective outrigger. The arc of the swing of each outrigger is directly proportional to and limited by the stroke of the hydraulic cylinder. In the example of FIGS. 1A and 1B, the swing of the rear outriggers (i.e., 102C and 102D) is limited to about 110 degrees.

SUMMARY

In certain embodiments, an outrigger system includes a frame, a first outrigger pivotally coupled to the frame, a second outrigger pivotally coupled to the frame, a first multi-arm assembly coupled to the first outrigger, a first hydraulic cylinder coupled to the multi-arm assembly, a second multi-arm assembly coupled to the second outrigger, and a second hydraulic cylinder coupled to the multi-arm assembly. The first multi-arm assembly includes a first arm and a second arm arranged to permit the first outrigger to rotate, with respect to the frame, among a first stowed position, a first fully deployed position, and a first site transportation position. The first hydraulic cylinder is configured to extend and retract to rotate the first multi-arm assembly between the first positions. The second multi-arm assembly includes a third arm and a fourth arm arranged to permit the second outrigger to rotate, with respect to the frame, among a second stowed position, a second fully deployed position, and a second site transportation position. The second hydraulic cylinder is configured to extend and retract to rotate the second multi-arm assembly between the second positions.

In certain embodiments, an outrigger system includes an outrigger frame, a pair of hydraulic cylinders coupled to the outrigger frame, a pair of rear outriggers coupled to the outrigger frame and coupled to respective hydraulic cylinders, and a pair of multi-arm assemblies coupled to respective rear outriggers and respective hydraulic cylinders and arranged to permit the pair of rear outriggers to rotate, with respect to the outrigger frame, among a first stowed position, a first fully deployed position, and a first site transportation position via extension and retraction of the pair of hydraulic cylinders.

In certain embodiments, an outrigger system includes a frame, a first outrigger pivotally coupled to the frame, a second outrigger pivotally coupled to the frame, means for rotating the first outrigger, with respect to the frame, among a first stowed position, a first fully deployed position, and a first site transportation position, and means for rotating the first outrigger, with respect to the frame, among a first stowed position, a first fully deployed position, and a first site transportation position.

BRIEF DESCRIPTION OF THE DRAWINGS

FIG. 8 shows a top-down view of the outrigger system of FIG. 3, in accordance with certain embodiments of the present disclosure.

DETAILED DESCRIPTION

Figure 1:
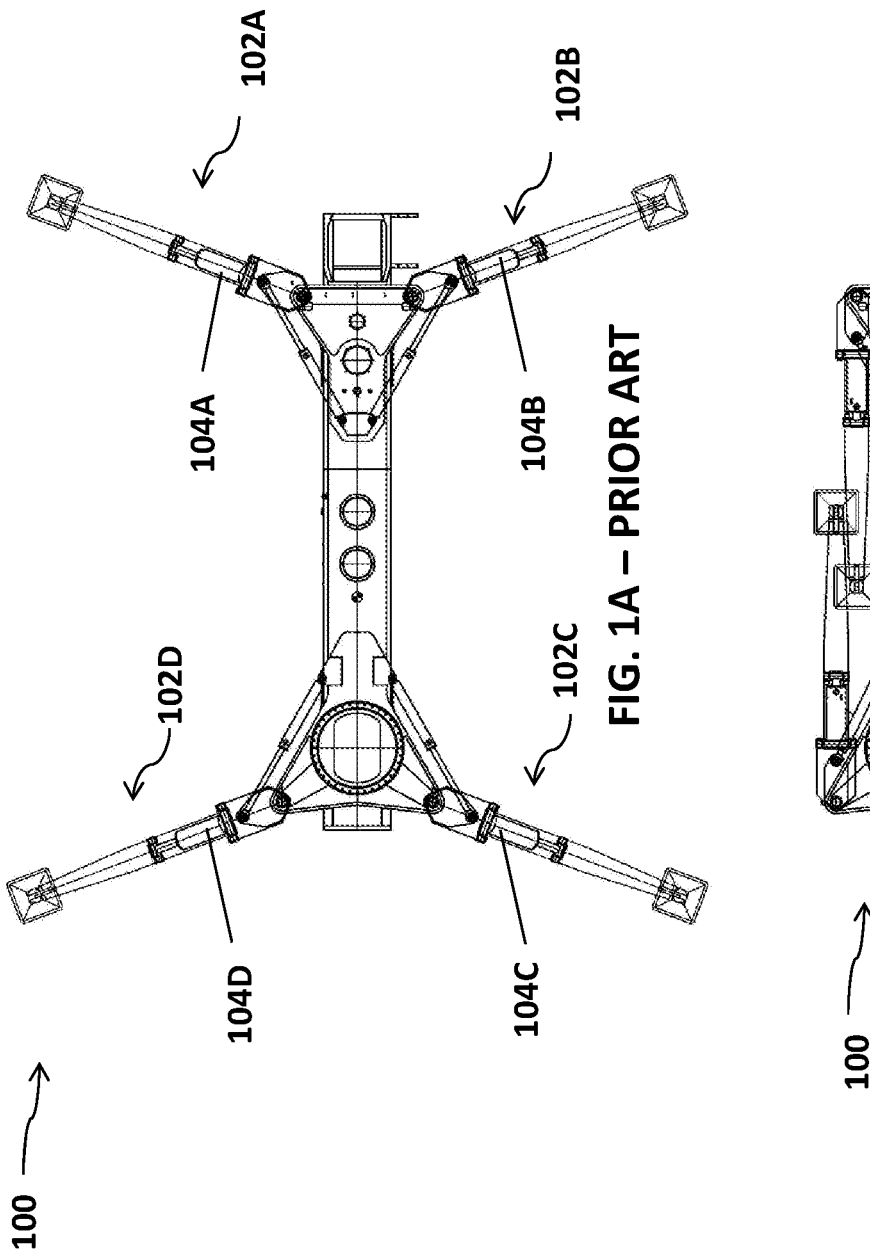
FIGS. 1A-1B show top-down views of a prior art outrigger system.
Figure 2:
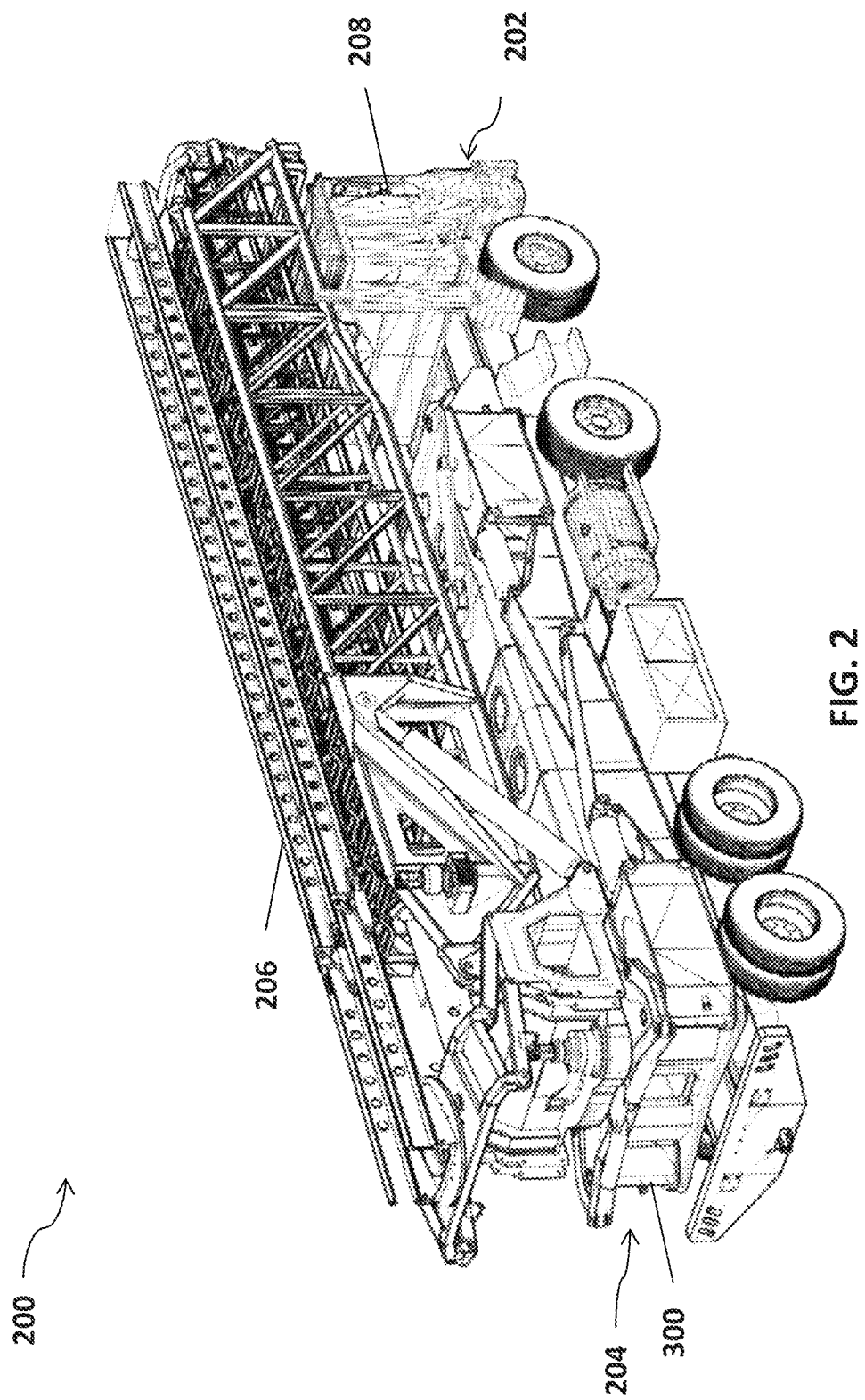
FIG. 2 shows a perspective view of a vehicle with an outrigger system, in accordance with certain embodiments of the present disclosure.

FIG. 2 shows a vehicle 200 having a front end 202 (e.g., a cab end) and a back end 204 opposite the front end 202. The vehicle 200 includes a conveyor system 206 mounted to the vehicle 200. The vehicle 200 includes an outrigger system 300 that is configured to stabilize the vehicle 200 when the conveyor system 206 is in use. Other systems such as pump systems, crane systems, and the like could be mounted on the vehicle 200 in place of the conveyor system 202. The vehicle 200 also includes a cab 208 in which an operator can control aspects of the vehicle 200, the conveyor system 206, and the outrigger system 300.

Figure 3:
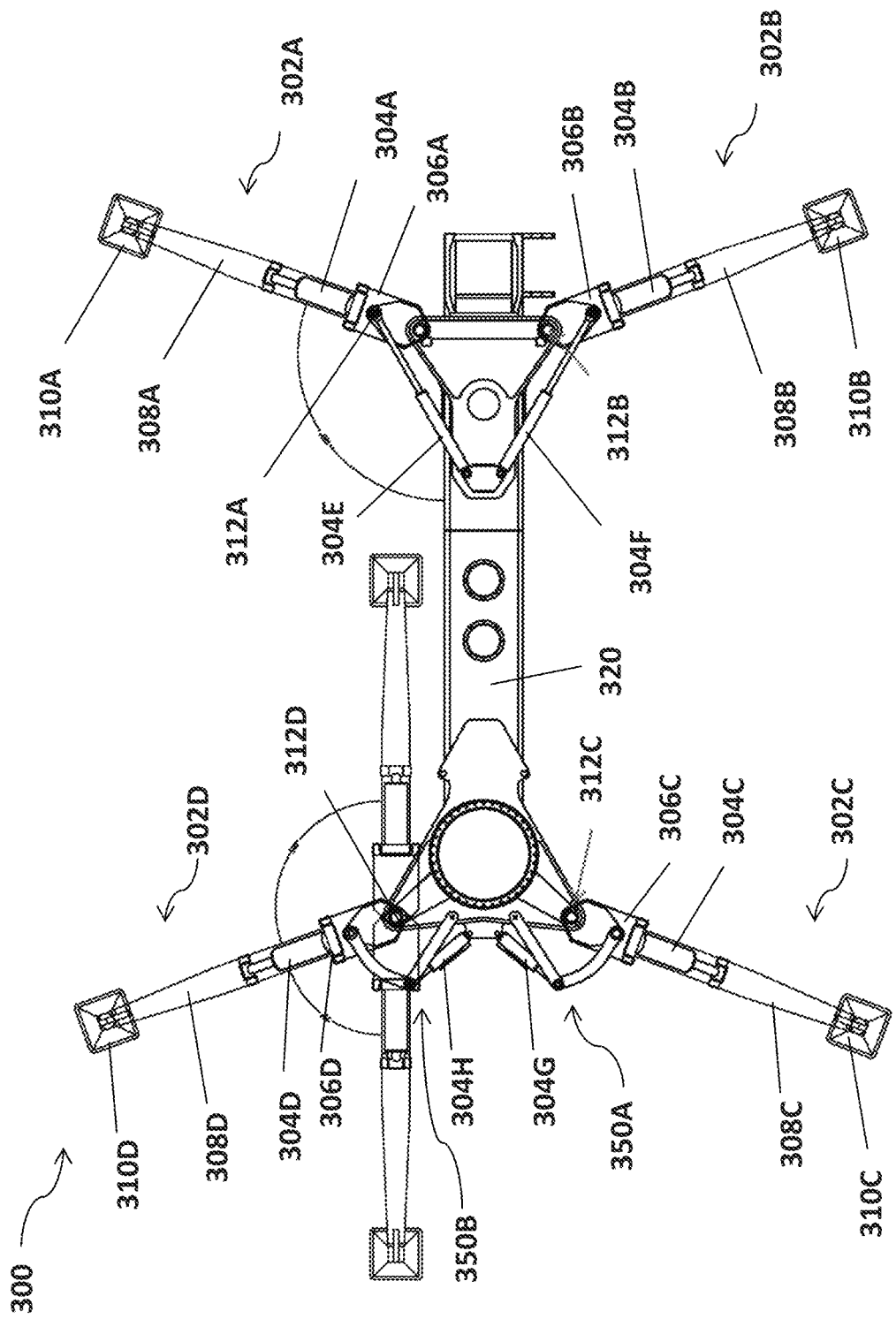
FIG. 3 shows a top-down view of an outrigger system, in accordance with certain embodiments of the present disclosure.

FIG. 3 shows a top view of the outrigger system 300 separate from the vehicle 200. The outrigger system 300 includes a first outrigger 302A and a second outrigger 302B, which are to be mounted near the front end 202 of the vehicle 200 and collectively may be referred to as the front outriggers. The first outrigger 302A includes a first hydraulic cylinder 304A, a first arm 306A, a first leg 308A, and a first foot 310A. The second outrigger 302B includes a second hydraulic cylinder 304B, a second arm 306B, a second leg 308B, and a second foot 310B. Both the first outrigger 302A and the second outrigger 302B are configured to rotate around respective first and second pivot points, 312A and 312B. Rotation of the first outrigger 302A and the second outrigger 302B is limited to approximately 110 degrees to avoid interfering (e.g., contacting and damaging) with the cab 208. For example, the first outrigger 302A and the second outrigger 302B may rotate between a stowed position where the outriggers are parallel to a side of the vehicle 200 (i.e., rotated zero degrees) and a fully extended position where the outriggers are rotated approximately 110 degrees from the side of the vehicle 200.

The outrigger system 300 also includes a third outrigger 302C and a fourth outrigger 302D, which are to be mounted near the back end 204 of the vehicle 200 and collectively may be referred to as the rear outriggers. The third outrigger 302C includes a third hydraulic cylinder 304C, a third arm 306C, a third leg 308C, and a third foot 310C. The fourth outrigger 302D includes a fourth hydraulic cylinder 304D, a fourth arm 306D, a fourth leg 308D, and a fourth foot 310D. Both the third outrigger 302C and the fourth outrigger 302D are configured to rotate around respective third and fourth pivot points, 312C and 312D. Each of the outriggers 302A-D are coupled to one or more members (e.g., plates) of a central frame 320 via a bolt or pin.

Each of the outriggers 302A-D of the outrigger system 300 are configured and arranged to move between an extended position and a retracted position via extension and retraction of the hydraulic cylinders 304A-D. When moving from the retracted position to the extended position, the legs 308A-D rotate such that the feet 310A-D are lowered towards the ground. Further, the front outriggers 302A-B are configured and arranged to rotate between a stowed position and a fully deployed position via extension and retraction of a fifth hydraulic cylinder 304E and a sixth hydraulic cylinder 304F, respectively.

As will be discussed in more detail below, the rear outriggers 304C-D are configured and arranged to rotate 180 degrees, which may encompass a stowed position (i.e., at zero degrees with respect to the vehicle 200), a fully deployed position (i.e., between about 70 degrees and about 140 degrees), and a site transportation position (i.e., rotated about 170 degrees to 180 degrees). The rear outriggers 304C-D rotate in response to extension and retraction of a seventh hydraulic cylinder 304G and an eighth hydraulic cylinder 304H, respectively. FIG. 3 shows the fourth outrigger 302D at its stowed position, fully deployed position, and site transportation position.

Figure 4:
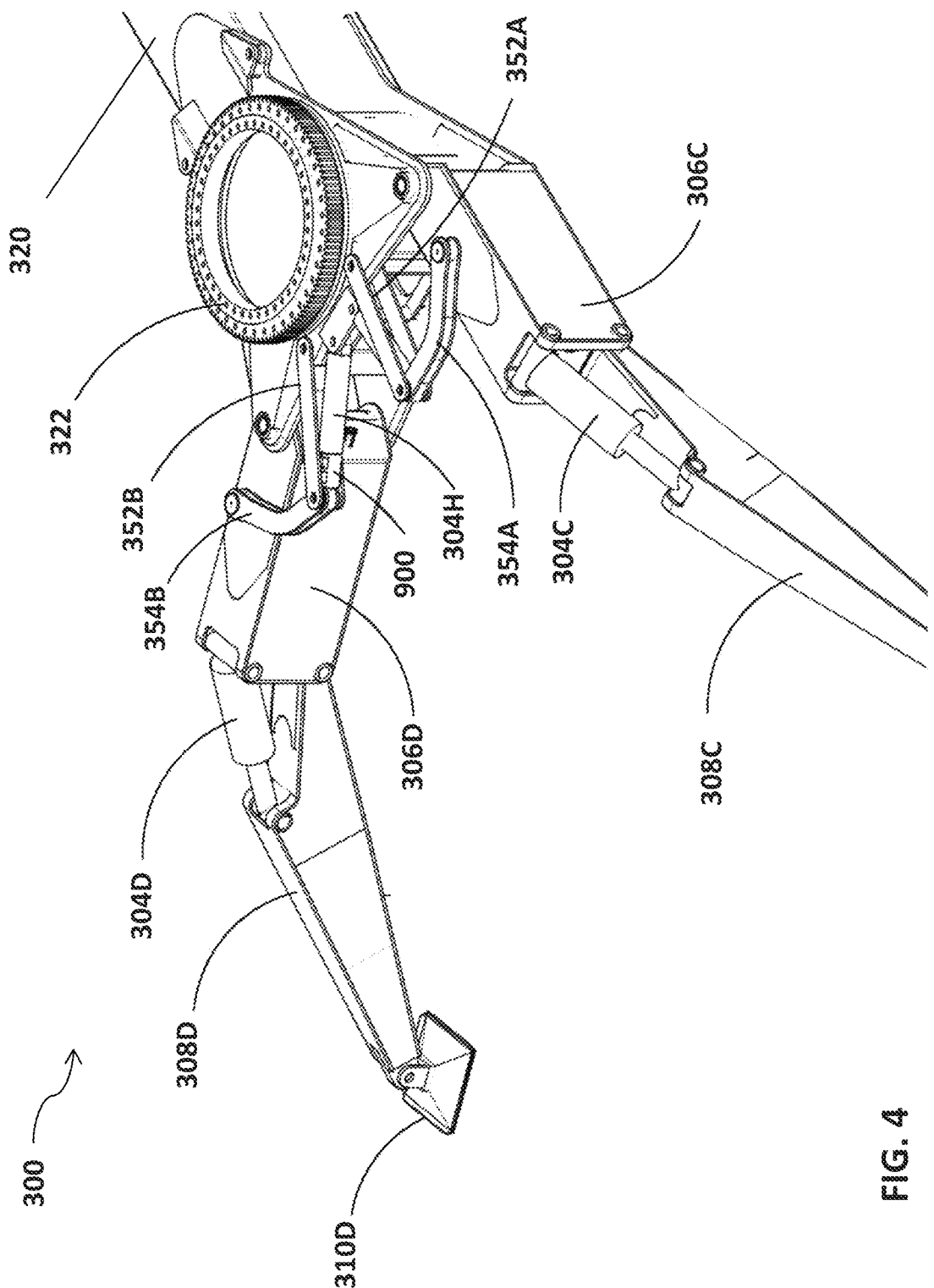
FIG. 4 shows a perspective view of the outrigger system of FIG. 3, in accordance with certain embodiments of the present disclosure.

FIG. 4 shows the outrigger system 300 including a first multi-link assembly 350A and a second multi-link assembly 350B connected at the rear end 204 of the vehicle 200. The first multi-link assembly 350A includes a first straight arm 352A and a first curved arm 354A, and the second multi-link assembly 350B includes a second straight arm 352B and a second curved arm 354B. The first straight arm 352A and the first curved arm 354A are pivotally connected to each other and an end of the seventh hydraulic cylinder 304G, and the second straight arm 352B and the second curved arm 354B are pivotally connected to each other and an end of the eighth hydraulic cylinder 304H. The first straight arm 352A is coupled to a member of the central frame 320, and the second straight arm 352B is coupled to a member of the central frame 320. The first curved arm 354A is coupled to the third leg 306C of the third outrigger 302C, and the second curved arm 354B is coupled to the fourth leg 306D of the fourth outrigger 302D. In certain embodiments, both arms of each multi-link assembly are curved and or otherwise bent. In certain embodiments, both arms of each multi-link assembly are straight. In certain embodiments, as shown in FIG. 4, the first multi-link assembly 350A and the second multi-link assembly 350B can include multiple straight arms. The seventh cylinder 304G and the eighth hydraulic cylinder 304H are also coupled to a member of the central frame 320. As shown in FIG. 4, a geared rotation bearing 322 can be coupled to the central frame 320 and used for rotation of a turret for the conveyor system 206.

The arrangement of the first multi-link assembly 350A and the seventh hydraulic cylinder 304G enables the third outrigger 302C to rotate past the fully deployed position to its site transportation position (e.g., a straight back position, 180 degrees, or close to straight back position, 170 degrees). Similarly, the arrangement of the second multi-link assembly 350B and the eighth hydraulic cylinder 304H enables the fourth outrigger 302D to rotate past the fully deployed position to its site transportation position (e.g., a straight back position, 180 degrees, or close to straight back position, 170 degrees).

Generally, the site transport position provides additional flexibly for maneuvering the vehicle 200 between work locations at a working site. For example, when the vehicle 200 is positioned at a work location, the physical limitations of the work location (e.g., surrounding structures such as buildings, roads with vehicle travel) might not permit the rear outriggers 302C-D to rotate between their respective stowed positions to their fully deployed positions. But, the rear outriggers 302C-D may be able to rotate between their respective site transportation positions to their fully deployed positions.

As shown in the Figures, the first multi-link assembly 350A and the seventh hydraulic cylinder 304G arrangement and the second multi-link assembly 350B and the eighth hydraulic cylinder 304H arrangement are positioned at or near a distal end of the central frame 320. The outrigger system 300 is arranged to provide space at or near the distal end of the central frame 320 for the seventh hydraulic cylinder 304G and the eighth hydraulic cylinder 304H to extend and retract and therefore translate members of the first multi-link assembly 350A and the second multi-link assembly 350B.

Figure 5:
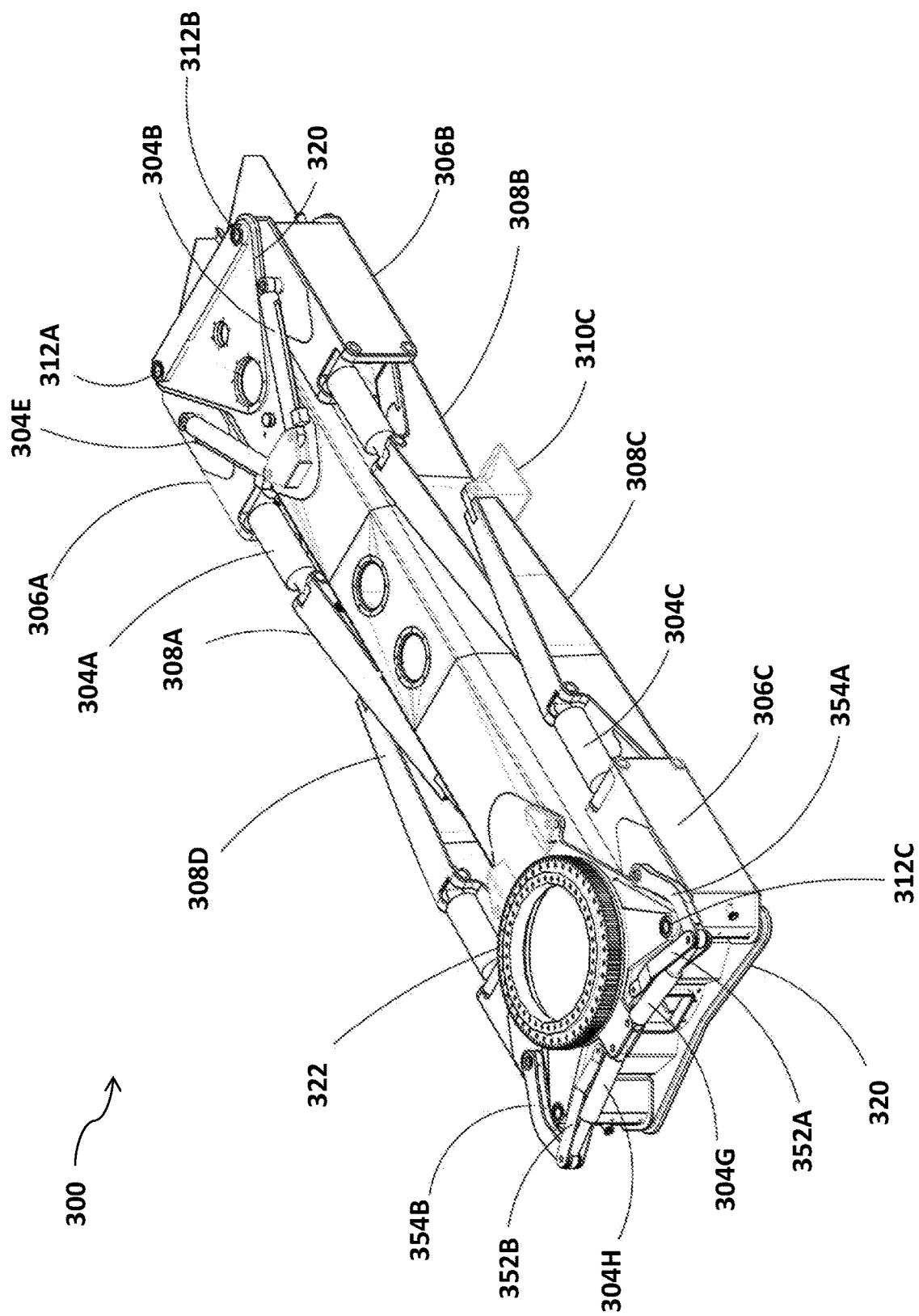
FIG. 5 shows a perspective view of the outrigger system of FIG. 3, in accordance with certain embodiments of the present disclosure.
Figure 6:
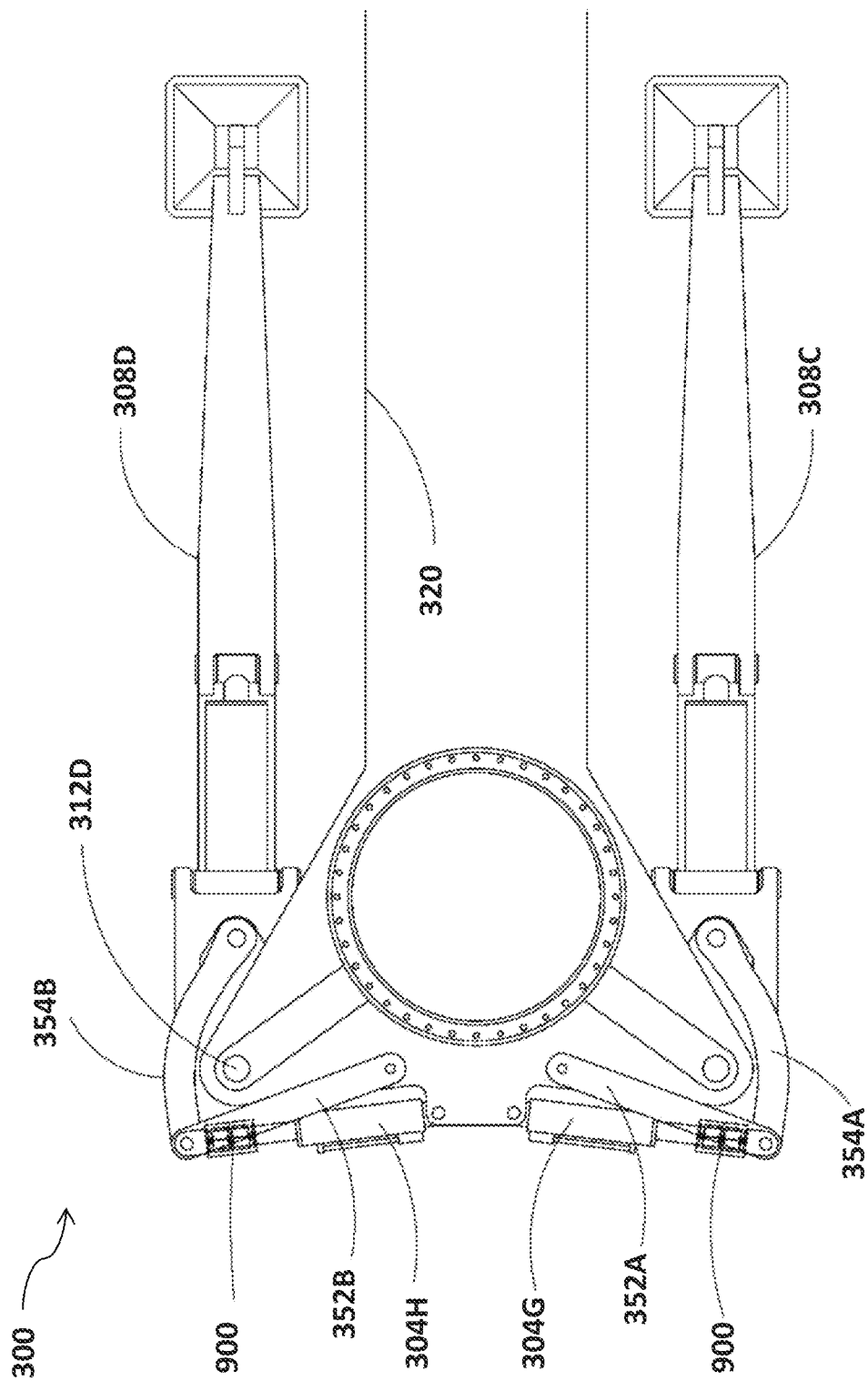
FIG. 6 shows a top-down view of the outrigger system of FIG. 3, in accordance with certain embodiments of the present disclosure.
Figure 7:
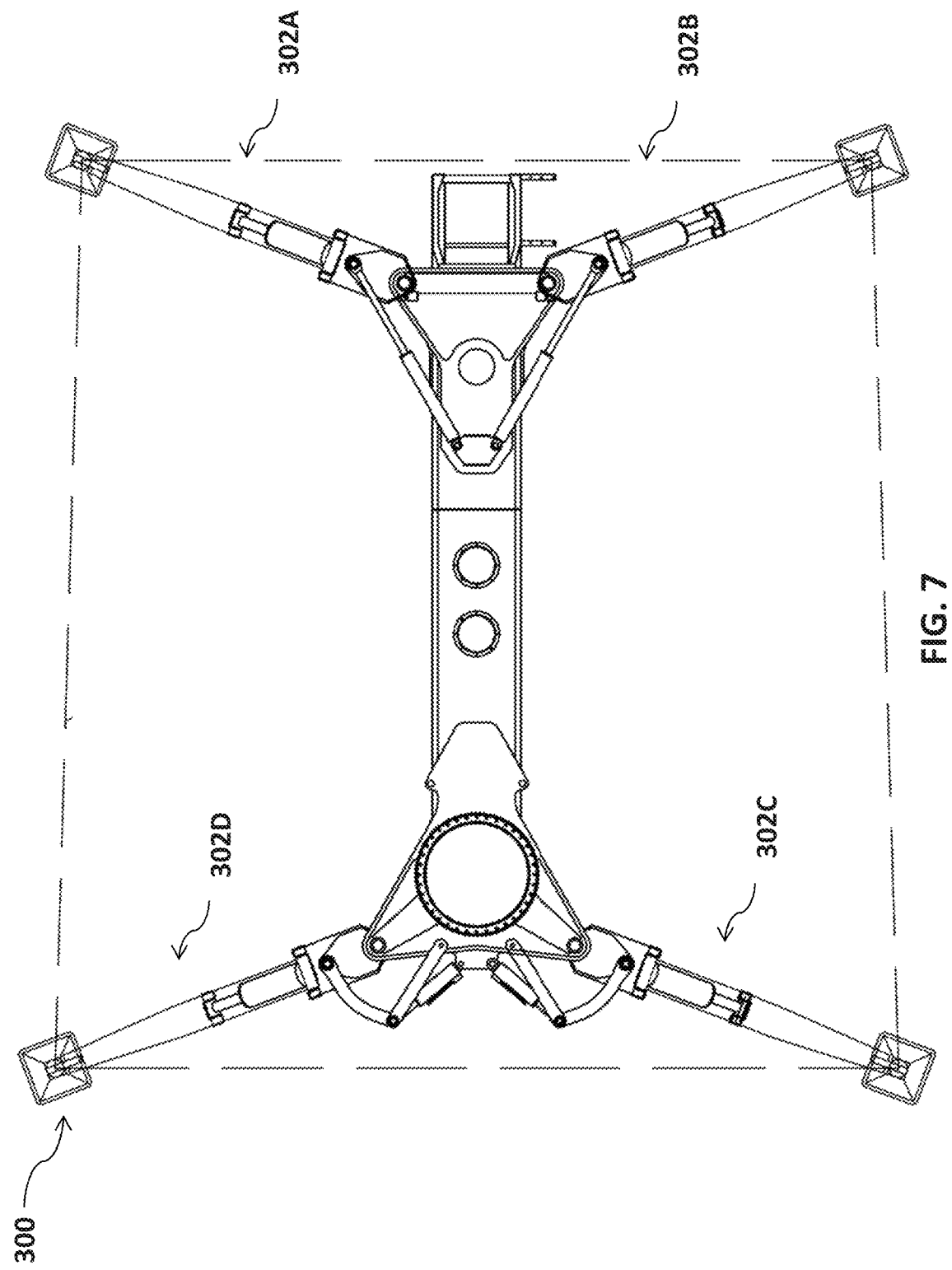
FIG. 7 shows a top-down view of the outrigger system of FIG. 3, in accordance with certain embodiments of the present disclosure.
Figure 9A:
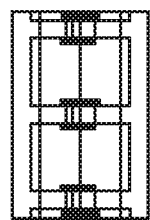
FIGS. 9A-9D show views of a collar, in accordance with certain embodiments of the present disclosure.
Figure 9B:
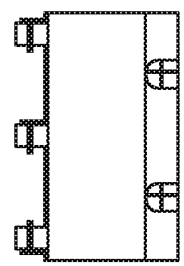
Figure 9C:
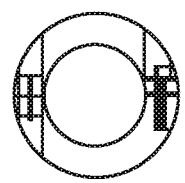
Figure 9D:
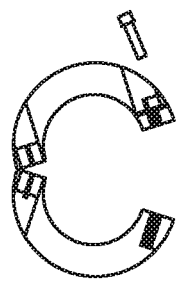
Figure 10A:
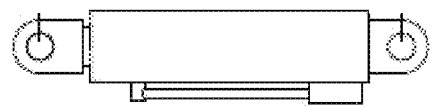
FIGS. 10A-10D show views of a hydraulic cylinder, in accordance with certain embodiments of the present disclosure.
Figure 10B:
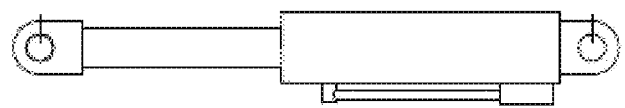
Figure 10C:
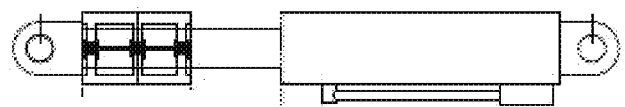
Figure 10D:
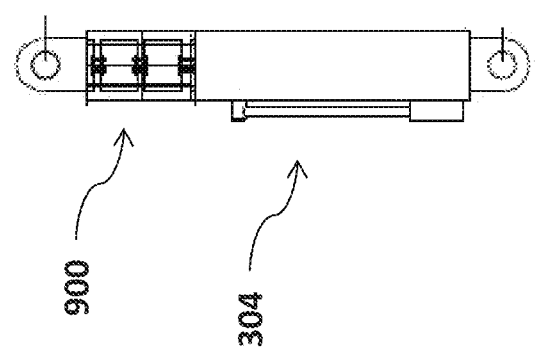

FIG. 5 shows the outriggers 302A-D in their respective stowed positions, and FIG. 6 shows just the rear outriggers 302C-D in their respective stowed positions. FIG. 7 shows the outrigger system 300 in a position where each of the outriggers 302A-D are in the extended position and respective fully deployed positions. The dotted lines in FIG. 7 show the footprint of the of outrigger system 300 when fully extended and deployed. FIG. 8 shows the outrigger system 300 in a position where the first outrigger 302A, the second outrigger 302B, and the third outrigger 302C are in the extended position and respective fully deployed positions. The fourth outrigger 302D is in the retracted position and the site transportation position. The dotted lines in FIG. 8 show the footprint of the of outrigger system 300.

Figure 11:
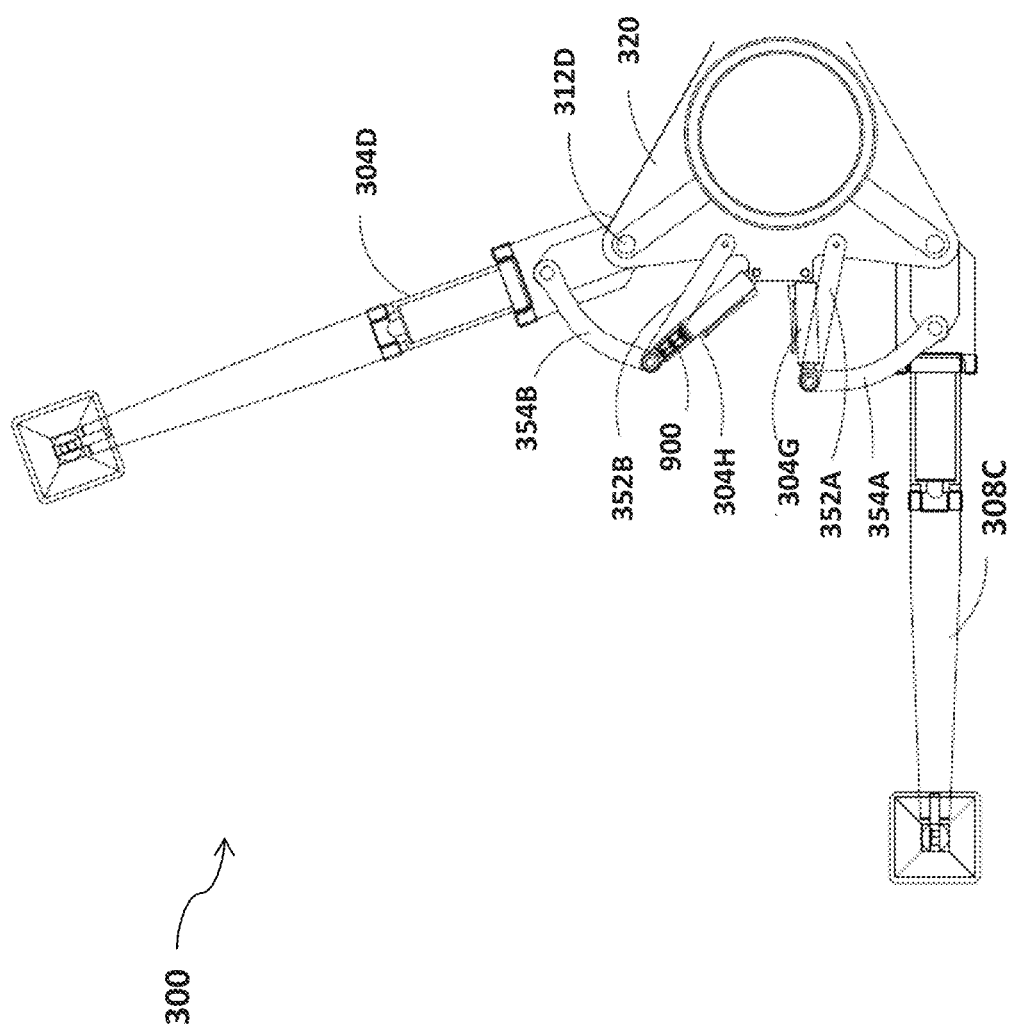
FIG. 11 shows a top-down view of the outrigger system of FIG. 3, in accordance with certain embodiments of the present disclosure.

FIGS. 9A-9D show a positive stop collar 900, which is one preferred approach for ensuring a precise stop at the fully deployed position, e.g., 110 degrees. The stop collar 900 is a collar that removably attaches to seventh hydraulic cylinder 304G and/or the eighth hydraulic cylinder 304H short stroke cylinder. In use, the stop collar 900 limits how far one of the outriggers 302A-D can rotate (e.g., limit rotation from the stowed position to the fully deployed position). FIGS. 10A-10D show how the stop collar 900 limits how much a hydraulic cylinder 304 can retract when the stop collar 900 is installed. In FIG. 11, the stop collar 900 is installed on the fourth hydraulic cylinder 304D but not installed on the third hydraulic cylinder 304C. As shown, when the stop collar 900 is installed, the fourth outrigger 302D cannot rotate past the fully deployed position (e.g., 110 degrees from the side of the vehicle 200), but the third outrigger 302C can rotate to the site transportation position (e.g., 180 degrees from the side of the vehicle 200). Stop collars are commercially available, but FIGS. 9A-9D show a preferred stop collar 900, which is split into two halves for easy removal.

Preferred alternatives to a stop collar include providing a positive stop via a removable mechanical stop that acts upon a portion of the outrigger, such as a removal pin. Such mechanical stops could be hydraulically activated or manually activated by an operator. Other alternatives include electrical limit switches, proximity sensors, and automation. An electrical limit switch interacts with the hydraulic controls of the operator to define rotation to the fully deployed position. The limit can be overridden, for example, by a separate control operation, such as a button push.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the appended claims.

What is claimed is:

1. A support system comprising:
   a frame extending along a longitudinal axis between a first end and a second end;
   a first outrigger pivotally coupled to the frame;
   a second outrigger pivotally coupled to the frame;
   a first multi-arm assembly coupled to the first outrigger and including a first arm and a second arm arranged to permit the first outrigger to rotate, with respect to the longitudinal axis of the frame, among a first stowed position, a first fully deployed position, and a first site transportation position, the first arm and the second arm arranged to rotate around a first shared axis;
   a first hydraulic cylinder coupled to the multi-arm assembly and configured to extend and retract to rotate the first multi-arm assembly between the first positions;
   a second multi-arm assembly coupled to the second outrigger and including a third arm and a fourth arm arranged to permit the second outrigger to rotate, with respect to the longitudinal axis of the frame, among a second stowed position, a second fully deployed position, and a second site transportation position, the third arm and the fourth arm arranged to rotate around a second shared axis,
   wherein the first and the second stowed positions are between about 0 degrees and 10 degrees of rotation with respect to the longitudinal axis of the frame, wherein the first and the second fully deployed positions are between about 70 degrees to about 140 degrees with respect to the longitudinal axis of the frame, and the first and the second site transportation positions are between about 170 degrees to about 180 degrees of rotation with respect to the longitudinal axis of the frame; and
   a second hydraulic cylinder coupled to the second multi-arm assembly and configured to extend and retract to rotate the second multi-arm assembly between the second positions.

2. The support system of claim 1, wherein the site transportation position is past the fully deployed position and past 90 degrees of rotation from the stowed position.

3. The support system of claim 1, wherein the first arm is coupled to the second arm on one end and to the first outrigger on the other end, wherein the second arm is coupled to the frame on one end and the first arm on the other end, wherein the third arm is coupled to the fourth arm on one end and to the second outrigger on the other end, wherein the fourth arm is coupled to the frame on one end and the third arm on the other end.

4. The support system of claim 1, wherein the first arm and the third arm are curved, and wherein the second arm and the fourth arm are straight.

5. The support system of claim 1, wherein the first arm, the second arm, the third arm, and the fourth arm are curved.

6. The support system of claim 1, wherein the first outrigger includes a fifth arm coupled to the frame and a first leg, which is coupled to a first foot; and wherein the second outrigger includes a sixth arm coupled to the frame and a second leg, which is coupled to a second foot.

7. The support system of claim 6, further comprising:
   a third hydraulic cylinder coupled between the fifth arm and the first leg such that extension of the third hydraulic cylinder lowers the first foot; and
   a fourth hydraulic cylinder coupled between the sixth arm and the second leg such that extension of the fourth hydraulic cylinder lowers the second foot.

8. The support system of claim 1, further comprising:
   a third outrigger pivotally coupled to the frame; and
   a fourth outrigger pivotally coupled to the frame.

9. The support system of claim 1, further comprising:
   a stop collar coupled to the first hydraulic cylinder.

10. A system comprising:
    a vehicle having a front end and a back end; and
    an outrigger system coupled to the vehicle and including:
    an outrigger frame extending along a longitudinal axis between a first end and a second end, a first pair of hydraulic cylinders coupled to the outrigger frame and arranged to extend and retract along the same plane, a pair of rear outriggers coupled to the outrigger frame, positioned near the back end of the vehicle, and coupled to respective hydraulic cylinders of the first pair of hydraulic cylinders, a pair of multi-arm assemblies coupled to respective rear outriggers and respective hydraulic cylinders of the first pair of hydraulic cylinders and arranged to permit the pair of rear outriggers to rotate, with respect to the longitudinal axis of the outrigger frame, among a stowed position, a fully deployed position, and a site transportation position via extension and retraction of the first pair of hydraulic cylinders, a second pair of hydraulic cylinders coupled to the outrigger frame, and a pair of front outriggers coupled to the outrigger frame near the front end of the vehicle and coupled to respective hydraulic cylinders of the second pair of hydraulic cylinders.

11. The system of claim 10, wherein the site transportation position is past the fully deployed position and past 90 degrees of rotation from the stowed position.

12. The system of claim 10, wherein the stowed position is between about 0 degrees and 10 degrees of rotation with respect to the longitudinal axis of the frame, wherein the fully deployed position is between about 70 degrees to about 140 degrees with respect to the longitudinal axis of the frame, and the site transportation position is between about 170 degrees to about 180 degrees of rotation with respect to the longitudinal axis of the frame.

13. The system of claim 10, wherein the pair of multi-arm assemblies each include a first arm coupled to respective second arms on one end and to respective outriggers on the other end, wherein the pair of multi-arm assemblies each include the respective second arms coupled to the outrigger frame on one end and the respective first arm on the other end.

14. The system of claim 13, wherein the respective first arms are curved, and wherein the respective second arms are straight.

15. The system of claim 10, wherein the pair of rear outriggers each includes an arm coupled to the outrigger frame and a leg, which is coupled to a foot.

16. The support system of claim 1, wherein the frame includes:

a top side,
a bottom side,
a first side on one side of the longitudinal axis, and
a second side on the opposite side of the longitudinal axis from the first side,
wherein the first hydraulic cylinder and the first multi-arm assembly are positioned on the first side and do not cross the longitudinal axis at the first stowed position, the first fully deployed position, and the first site transportation position.

17. The support system of claim 16, wherein the second hydraulic cylinder and the second multi-arm assembly are positioned on the second side and do not cross the longitudinal axis at the second stowed position, the second fully deployed position, and the second site transportation position.

18. The support system of claim 10, wherein each multi-arm assembly is entirely positioned on opposite sides of the longitudinal axis at the stowed position, the fully deployed position, and the site transportation position.

19. An outrigger system comprising:

an outrigger frame extending along a longitudinal axis between a first end and a second end;

a first pair of hydraulic cylinders coupled to the outrigger frame;

a pair of rear outriggers coupled to the outrigger frame and coupled to respective hydraulic cylinders of the first pair of hydraulic cylinders; and a pair of multi-arm assemblies coupled to respective rear outriggers and respective hydraulic cylinders of the first pair of hydraulic cylinders and arranged to permit the pair of rear outriggers to rotate, with respect to the longitudinal axis of the outrigger frame, among a stowed position, a fully deployed position, and a site transportation position via extension and retraction of the first pair of hydraulic cylinders, wherein each of the multi-arm assemblies translates along the same plane as the rear outriggers are positioned among the stowed position, the fully deployed position, and the site transportation position.

20. The outrigger system of claim 19, further comprising:

a second pair of hydraulic cylinders coupled to the outrigger frame; and a pair of front outriggers coupled to the outrigger frame and coupled to respective hydraulic cylinders of the second pair of hydraulic cylinders.

\* \* \* \* \*